(12) United States Patent
Eifert et al.

(10) Patent No.: US 11,068,490 B2
(45) Date of Patent: *Jul. 20, 2021

(54) AUTOMATED DOCUMENT FILTRATION WITH MACHINE LEARNING OF ANNOTATIONS FOR DOCUMENT SEARCHING AND ACCESS

(71) Applicant: International Business Machines Corporation, Armonk, NY (US)

(72) Inventors: Cheryl L. Eifert, Watertown, MA (US); Fang Wang, Plano, TX (US); Jia Xu, Somerville, MA (US); Kirk A. Beaty, Golden Bridge, NY (US); Vanessa Michelini, Boca Raton, FL (US); Claudia S. Huettner, Jamaican Plain, MA (US); Marta Sanchez-Martin, Somerville, MA (US); Pengwei Yang, Belmont, MA (US)

(73) Assignee: International Business Machines Corporation, Armonk, NY (US)

( * ) Notice: Subject to any disclaimer, the term of this patent is extended or adjusted under 35 U.S.C. 154(b) by 7 days.

This patent is subject to a terminal disclaimer.

(21) Appl. No.: 16/239,931

(22) Filed: Jan. 4, 2019

(65) Prior Publication Data

US 2020/0218719 A1 Jul. 9, 2020

(51) Int. Cl.
*G06F 16/2458* (2019.01)
*G06N 20/00* (2019.01)
(Continued)

(52) U.S. Cl.
CPC .... *G06F 16/2465* (2019.01); *G06F 16/24578* (2019.01); *G06F 16/285* (2019.01); *G06F 16/93* (2019.01); *G06N 20/00* (2019.01)

(58) Field of Classification Search
None
See application file for complete search history.

(56) References Cited

U.S. PATENT DOCUMENTS 7,130,848 B2   10/2006   Oosta
7,461,006 B2   12/2008   Gogolak
(Continued)

FOREIGN PATENT DOCUMENTS

WO   2016016879 A1   2/2016
WO   2019243486 A1   12/2019

OTHER PUBLICATIONS

Wei et al., "tmVar 2.0: integrating genomic variant information from literature with dbSNP and ClinVar for precision medicine." doi: 10.1093/bioinformatics/btx541. Bioinformatics. Jan. 1, 2018;34(1): pp. 80-87.

(Continued)

*Primary Examiner* — Aleksandr Kerzhner
*Assistant Examiner* — Eddy Cheung
(74) *Attorney, Agent, or Firm* — Ryan Lewis; Edell, Shapiro & Finnan, LLC

(57) ABSTRACT

Computer-based methods, systems, and computer readable media for managing documents within a content repository or documents within the document subsets are provided. Documents within the content repository may be classified into one of a functional category and a clinical category. Documents are applied to a machine learning annotation and analysis module to automatically annotate the documents to indicate relationships between entities. A request is processed for the documents including one or more search terms, wherein the search terms pertain to one or more entities from a group of gene, gene variant, drug, cancer and a biomedical/clinical term. Documents satisfying the request are identified by comparing the one or more search terms to the annotations and specific sections of the documents, and (Continued)

determining a relevance of a document based on the comparison and a frequency of the one or more search terms in each of the specific sections. The identified documents are ranked according to custom techniques.

20 Claims, 12 Drawing Sheets

(51) Int. Cl.
  *G06F 16/93* (2019.01)
  *G06F 16/28* (2019.01)
  *G06F 16/2457* (2019.01)

(56) References Cited

U.S. PATENT DOCUMENTS

| | | | |
|---|---|---|---|
| 8,903,825 | B2 | 12/2014 | Parker et al. |
| 9,483,532 | B1* | 11/2016 | Zhang .................. G06F 16/3334 |
| 9,495,349 | B2 | 11/2016 | Angell et al. |
| 9,690,861 | B2 | 6/2017 | Boloor et al. |
| 10,713,440 | B2 | 7/2020 | Pestian et al. |
| 2001/0034023 | A1 | 10/2001 | Stanton et al. |
| 2003/0177112 | A1 | 9/2003 | Gardner |
| 2004/0142325 | A1 | 7/2004 | Mintz et al. |
| 2005/0060305 | A1 | 3/2005 | Hopkins et al. |
| 2007/0112748 | A1 | 5/2007 | Angell et al. |
| 2008/0027913 | A1 | 1/2008 | Chang et al. |
| 2009/0012956 | A1* | 1/2009 | Wen ...................... G06F 16/951 |
| 2009/0019032 | A1 | 1/2009 | Bundschus et al. |
| 2011/0119212 | A1 | 5/2011 | De Bruin et al. |
| 2012/0116795 | A1 | 5/2012 | Ledley |
| 2013/0013603 | A1 | 1/2013 | Parker et al. |
| 2013/0091126 | A1 | 4/2013 | Krishnaswami et al. |
| 2013/0096946 | A1 | 4/2013 | Shah et al. |
| 2013/0144887 | A1 | 6/2013 | Chen et al. |
| 2014/0280086 | A1 | 9/2014 | Bouadjenek et al. |
| 2015/0088888 | A1 | 3/2015 | Brennan et al. |
| 2016/0019299 | A1 | 1/2016 | Boloor et al. |
| 2016/0048564 | A1 | 2/2016 | Bassett, Jr. et al. |
| 2016/0210426 | A1 | 7/2016 | Robinson et al. |
| 2016/0232321 | A1 | 8/2016 | Silverman |
| 2017/0255743 | A1 | 9/2017 | Torkamani |
| 2018/0081859 | A1 | 3/2018 | Snider et al. |
| 2018/0137249 | A1 | 5/2018 | Eggebraaten et al. |
| 2018/0137433 | A1 | 5/2018 | Devarakonda et al. |
| 2018/0211174 | A1 | 7/2018 | Allen et al. |
| 2018/0373844 | A1 | 12/2018 | Ferrandez-Escamez et al. |
| 2019/0034593 | A1 | 1/2019 | Bouman |
| 2019/0042563 | A1 | 2/2019 | Pestian et al. |
| 2019/0130073 | A1 | 5/2019 | Sun et al. |
| 2020/0175020 | A1 | 6/2020 | Eifert et al. |
| 2020/0175021 | A1 | 6/2020 | Eifert et al. |
| 2020/0184006 | A1 | 6/2020 | Eifert et al. |
| 2020/0226164 | A1 | 7/2020 | Eifert et al. |
| 2020/0227176 | A1 | 7/2020 | Eifert et al. |

OTHER PUBLICATIONS

Allot et al., "LitVar: A Semantic Search Engine for Linking Genomic Variant Data in PubMed and PMC." Nucleic Acids Research, vol. 46. Web Server issue (2018): W530-W536. PMC. Web., Aug. 15, 2018, 7 pages.

Wei et al., "GNormPlus: An Integrative Approach for Tagging Genes, Gene Families, and Protein Domains." BioMed Res Int 2015, vol. 2015, Article ID 918710, http://dx.doi.org/10.1155/2015/918710, Sep. 2015, 7 pages.

Seva et al., "Track 4: Mining protein interactions and mutations for precision medicine (PM)," BioCreative, 2017. www.biocreative.org/media/store/files/2018/BC6_track4_13.pdf, 5 pages.

Yepes et al., "Mutation extraction tools can be combined for robust recognition of genetic variants in the literature" [version 2; referees: 2 approved, 1 approved with reservations]. F1000Research 2014, 3:18 (doi: 10.12688/f1000research.3-18.v2), Nov. 2017, pp. 1-27.

Ravikumar et al., "Text Mining Facilitates Database Curation—Extraction of Mutation-Disease Associations from Bio-Medical Literature." BMC Bioinformatics, 16 (2015): 185, pp. 1-15.

Asma et al., "DiMeX: A Text Mining System for Mutation-Disease Association Extraction." PLoS ONE, 11(4):e0152725, 2016, 26 pages.

LexisNexus, "Developing a Search with LexistNexis." © 2014 LexisNexis. NBI01326-0 0414, https://www.lexisnexis.com/bis-user-information/docs/developingasearch.pdf, pp. 1-17.

U.S. National Library of Medicine, "Search Strategy Used to Create the Systematic Reviews Subset on PubMed," 2018, https://www.nlm.nih.gov/bsd/pubmed_subsets/sysreviews_strategy.html, Accessed Aug. 17, 2018, 2 pages.

U.S. National Library of Medicine, "PubMed Help," Bookshelf ID: NBK3827, 2018, https://www.ncbi.nlm.nih.gov/books/NBK3827, National Center for Biotechnology Information, Accessed Aug. 17, 2018, 125 pages.

Weng et al., "Medical Subdomain Classification of Clinical Notes Using a Machine Learning-Based Natural Language Processing Approach." BMC Medical Informatics and Decision Making 17 (2017): 155. PMC. Web., Aug. 16, 2018, pp. 1-13.

Kafkas et al., "Section Level Search Functionality in Europe PMC." Journal of Biomedical Semantics 6 (2015): 7. PMC. Web. Aug. 16, 2018, pp. 1-5.

Hofmann et al., "The impact of document structure on keyphrase extraction." In Proceedings of the 18th ACM conference on Information and knowledge management (CIKM '09). ACM, New York, NY, USA, 2009, pp. 1725-1728.

Xu et al., "A semi-supervised approach to extract pharmacogenomics-specific drug-gene pairs from biomedical literature for personalized medicine," Journal of Biomedical Informatics, vol. 46, Issue 4, 2013, pp. 585-593.

Lee et al., "Deep learning of mutation-gene-drug relations from the literature." BMC Bioinformatics (2018), 19:21. Published: Jan. 25, 2018, pp. 1-13.

Huang et al., "Predicting drug efficacy based on the integrated breast cancer pathway model," 2011 IEEE International Workshop on Genomic Signal Processing and Statistics (GENSIPS), San Antonio, TX, Dec. 2011, pp. 42-45.

Artemov et al., "A Method for Predicting Target Drug Efficiency in Cancer Based on the Analysis of Signaling Pathway Activation." Oncotarget, vol. 6, No. 30, www.impactjournals.com/oncotarget/, Aug. 2015, pp. 29347-29356.

Allahyari et al., "A Brief Survey of Text Mining: Classification, Clustering and Extraction Techniques", https://arxiv.org/pdf/1707.02919.pdf, Cornell Library University, arXiv:1707.02919v2 [cs.CL], Jul. 28, 2017, 13 pages.

Clematide et al., "Ranking Relations between Diseases, Drugs and Genes for a Curation Task", Journal of Biomedical Semantics, https://jbiomedsem.biomedcentral.com/articles/10.1186/2041-1480-3-S3-S5, Oct. 5, 2012, pp. 1-22.

Wu et al.; "Ranking Gene-Drug Relationships in Biomedical Literature using Latent Dirichlet Allocation", NCBI, https://www.ncbi.nlm.nih.gov/pmc/articles/PMC4095990/: Pac Symp Biocomput, Author manuscript, Jul. 14, 2014, pp. 1-15.

Chen et al., "IBM Watson: How Cognitive Computing Can Be Applied to Big Data Challenges in Life Sciences Research". Clinical Therapeutics, 2016, 38(4):688-701. doi: 10.1016/j.clinthera.2015.12.001. Epub Apr. 21, 2016, pp. 688-701.

NCBI, "PubMed", US National Library of Medicine National Institute of Health, 2018; https://www.ncbi.nlm.nih.gov/pubmed/ (accessed Nov. 30, 2018), 2 pages.

U.S. National Library of Medicine, "Medline/PubMed Resources Guide", 2018, https://www.nlm.nih.gov/bsd/pmresources.html (accessed Nov. 30, 2018), 7 pages.

List of IBM Patents or Patent Applications Treated as Related dated Mar. 26, 2019.

Tamborero et al., "Cancer Genome Interpreter Annotates the Biological and Clinical Relevance of Tumor Alterations" Genome Medicine (Mar. 28, 2018) 10(25): 8 pages, doi: https://doi.org/10.1101/140475.

(56) References Cited

OTHER PUBLICATIONS

Wei et al., "tmVar: a text mining approach for extracting sequence variants in biomedical literature", Original Paper, Bioinformatics, vol. 29, No. 11, Apr. 5, 2013, https://academic.oup.com/bioinformatics/article/29/11/1433/220291, 7 pages.

* cited by examiner

US 11,068,490 B2

AUTOMATED DOCUMENT FILTRATION WITH MACHINE LEARNING OF ANNOTATIONS FOR DOCUMENT SEARCHING AND ACCESS

1. TECHNICAL FIELD

Present invention embodiments relate to automated document filtration, and more specifically, to machine learning of annotations and document filtration in order to intelligently access specific combinations of information.

2. DISCUSSION OF THE RELATED ART

Databases and article repositories often contain a large corpus of documents of varying types of information. For example, a user may search NCBI's PubMed® database for different types of peer-reviewed biomedical articles, which provide evidence that a given biologic relationship has important therapeutic ramifications.

Two different types of evidence may determine the significance of a given biologic relationship; evidence regarding a gene's function (functional studies) and evidence regarding a patient's response to treatment with a targeted therapy (clinical studies).

Although PubMed® has a robust classification system for articles of the clinical type, PubMed® does not classify articles that describe functional studies. Additionally, access to many of the research articles in PubMed® is granted only if an institutional license agreement has been implemented with the journal's publisher or another form of payment has been submitted to acquire the rights to the article. Due to licensing agreements with many publishers of scientific journals, some content repositories may currently maintain over two million documents with no intelligent way to access the content. Currently, there is no single site, source, product or service that provides specific information regarding a combination of entities in a comprehensive way.

SUMMARY

According to embodiments of the present invention, methods, systems and computer readable media are provided for managing documents in a content repository, in order to facilitate intelligent access of various combinations of information in the content repository. Rules-based approaches and/or machine learning annotation and analysis modules may be used for annotating documents within a content repository.

Documents may be classified within the content repository into one of a functional category and a clinical category. Documents may be applied to a trained machine learning annotation and analysis module to automatically annotate the documents to indicate relationships between entities. A request is processed for the documents including one or more search terms, wherein the search terms pertain to one or more entities from a group of genes/gene variants, drugs, disease such as cancer and a biomedical/clinical term, such as "prognostic biomarker". Documents are identified that satisfy the request by comparing the one or more search terms to the annotations and specific sections of the documents, and determining a relevance of a document based on the comparison and a frequency of the one or more search terms in each of the specific sections. The identified documents are ranked accordingly. In some aspects, the identified documents may be ranked using a machine learning ranking module. In other aspects, the identified documents may be ranked in accordance with a priority based on a determined relevance.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Generally, like reference numerals in the various figures are utilized to designate like components.

FIG. 2A shows classification of a document as a clinical document. FIG. 2B shows classification of a document as a functional document. FIG. 2C shows classification of a document as a review article. FIG. 2D shows classification of a document as a case report. FIG. 2E shows classification of a document as a conference proceeding or abstract.

DETAILED DESCRIPTION

Figure 1:
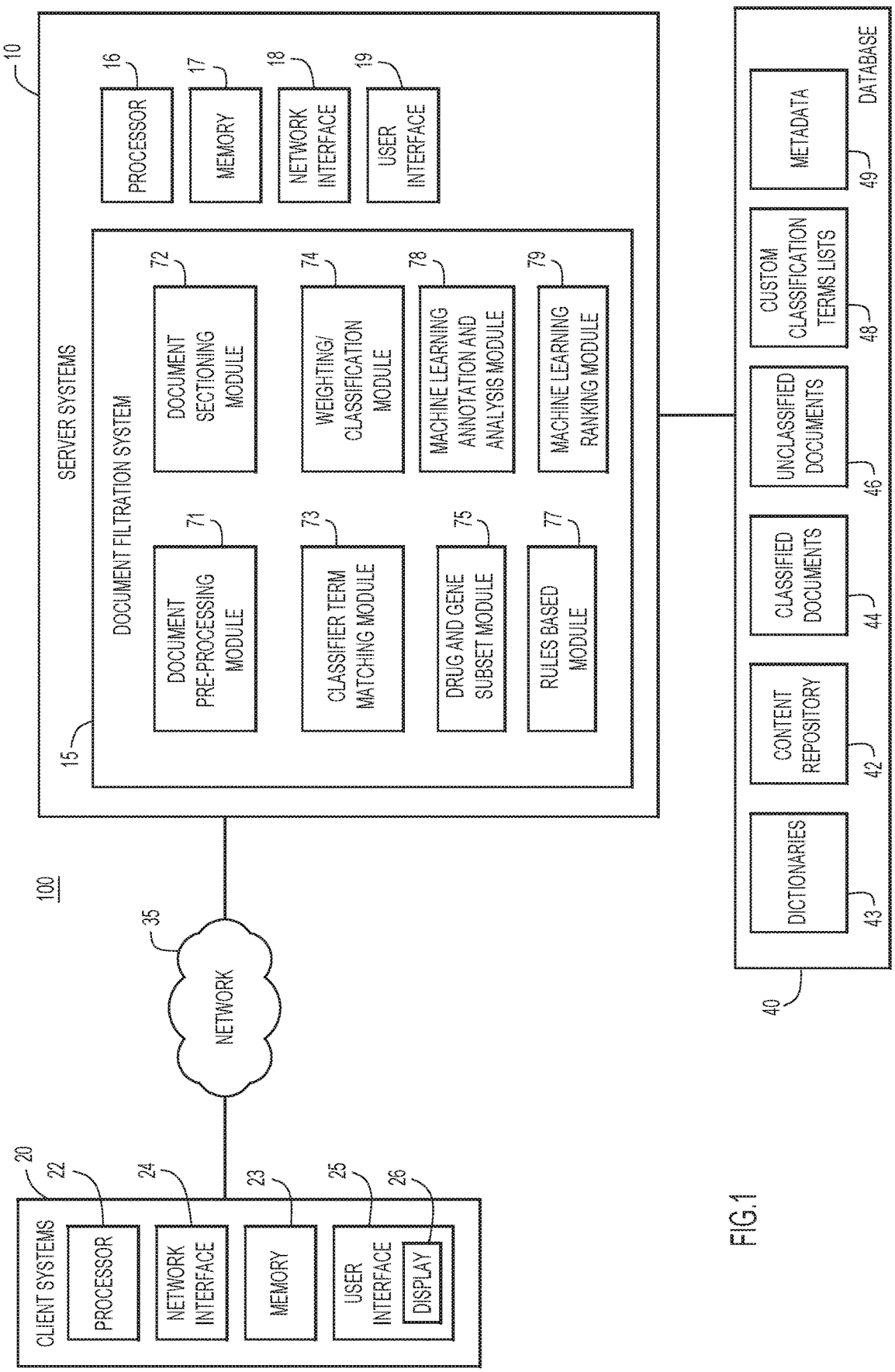
FIG. 1 is a block diagram of an example computing environment for the document filtration and machine learning system, according to embodiments of the present disclosure.

Methods, systems, and computer readable media are provided to manage documents, including using natural language processing (NLP) with rules-based tools to annotate genomic and proteomic information (entities) and machine learning to identify key relationships between those entities. The annotated documents indicate which genes and gene variants are within a respective document, and may reside in a database.

Clients (oncologists, pathologists, clinicians, etc.) may seek evidence that a specific gene mutation (or genetic variant) confers oncogenic properties to a translated protein and/or that a targeted therapy is efficacious in patients with a specific gene mutation.

A rules-based article filtration system may be used to identify and classify functional versus clinical articles that provide evidence pertinent to genomic cancer medicines. Licensed articles within the content repository may be preprocessed to provide the following sections: title, abstract, introduction, materials and methods, results, and discussion. NLP may be integrated with rules or machine learning based tools to annotate documents with publicly available or customized dictionaries.

Pre-annotated text, generated by integrating NLP with rules or machine learning-based tools, may be provided to a machine learning annotation and analysis module trained to predict relationships (e.g., between biomarker type and gene name; biomarker type and gene variant; biomarker type, gene variant, and drug name; biomarker type, gene variant, and cancer-type; biomarker type, gene variant, cancer-type, and drug name. A subject matter expert may create a ground truth training set, e.g., relationships between terms/entities found in the pre-annotated documents that will be used to build the machine learning annotation and analysis module and a test set to test the performance of the module to accurately annotate clean documents.

In other aspects, any of the following methods or combination thereof may be used to identify and annotate terms and entities, including an NLP-based tool, a rules-based model and publicly available or custom dictionaries of terms/entities, a machine learning model with a training set for annotating specific terms/entities, and/or NLP combined with rules for annotating terms and entities.

Articles may be ranked according to machine learning features and user search terms. Articles that have been annotated by a machine learning annotation and analysis module may be ranked using a machine ranking learning module based on the frequency of occurrence of entities (e.g., genes, gene variants, drugs, cancer-types, etc.) identified by the machine learning annotation and analysis module. In some cases, a machine learning ranking module is trained to predict which article(s) most closely match potential search criteria related to: 1) biomarker type, 2) gene name, 3) gene variant name, 4) disease or cancer-type, 5) targeted therapy name (e.g., drug name), 6) article type (functional or clinical), 7) section of the article with differential weighting, 8) term/entity counts, 9) article date, 10) journal name, 11) clinical trial stage, etc. A search request including one or more search terms may be processed by comparing the search terms to the documents and annotations. The documents may be partitioned into specific sections. The relevancy of a document is determined based on the comparison to the annotations and a frequency of occurrence of the search terms in each of the specific sections. The sections and/or annotations may be weighted to indicate an importance of each for the search. Once documents are identified as satisfying the search request, the documents are ranked in priority order based on the determined relevance to search characteristics or using the machine learning ranking module.

In some aspects, the articles may be ranked twice, with the first ranking based on features of machine learning and the second ranking (e.g., of the first ranked articles) based on user search terms. This approach provides enhanced document retrieval and search accuracy for genomic levels of evidence relative to simple key word searching.

In other embodiments, a machine learning ranking module may rank articles based on all these features (e.g., entities, relationships, counts, section of articles and corresponding weights, etc.).

An example environment for use with present invention embodiments is illustrated in FIG. 1. Specifically, the environment includes one or more server systems 10, and one or more client or end-user systems 20. Server systems 10 and client systems 20 may be remote from each other and communicate over a network 35. The network may be implemented by any number of any suitable communications media (e.g., wide area network (WAN), local area network (LAN), Internet, Intranet, etc.). Alternatively, server systems 10 and client systems 20 may be local to each other, and may communicate via any appropriate local communication medium (e.g., local area network (LAN), hardwire, wireless link, Intranet, etc.).

Client systems 20 enable users to access documents (e.g., functional documents, clinical documents, case studies, review articles, or meeting and proceeding abstracts, etc.) that have been annotated with genomic and proteomic information from server systems 10 for analysis and review. The server system may include a document filtration system 15 to classify and annotate documents in order to select and prioritize relevant information.

A database 40 may store various information for the filtration (e.g., content repository 42, classified documents 44, unclassified documents 46, custom classification terms lists 48, metadata 49, dictionaries 43, etc.). The database system may be implemented by any conventional or other database or storage unit, may be local to or remote from server systems 10 and client systems 20, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to the desired documents and filtration, and may provide reports including filtration results (e.g., percentage of documents classified into a respective category, percentage of documents not classified into a respective category, number of terms of a custom classification terms list found in a document, frequency of search terms in documents scored according to a priority score, ranking of annotated documents, etc.).

Server systems 10 and client systems 20 may be implemented by any conventional or other computer systems preferably equipped with a display or monitor 26, a base (e.g., including at least one processor 16, 22 one or more memories 17, 23 and/or internal or external network interfaces or communications devices 18, 24 (e.g., modem, network cards, etc.)), optional input devices (e.g., a keyboard, mouse or other input device) and/or user interface 19, 25 and any commercially available and custom software (e.g., server/communications software, document filtration system 15, browser/interface software, etc.).

Using a user interface, a user may search for documents in a content repository based upon document categories (e.g., clinical, functional, case report, review article or meeting & proceeding abstract, etc.), as well as terms for gene names, gene variant/mutation names, drugs, cancer types/cancer names, biomedical features, clinical features, or any combination of the preceding as well as synonyms thereof. Present techniques identify all or nearly all forms of gene/protein mutations as well as other types of genomic alterations, including insertions/deletions, copy number alterations, chromosomal rearrangements, and viral integrations. Pre-annotated text may be provided to a machine learning annotator to learn/develop relationships (e.g., gene/ gene mutations, effective drugs, etc.) for annotating documents.

Documents that satisfy the search request may be identified by comparing the one or more search terms to the annotations. The documents may be scored (a priority score) based on a measure of relevance of a document based on the comparison and a frequency of the one or more search terms in specific sections of the documents. Results may be provided as a ranked list of documents based upon the priority score or based on similarity to search terms from a machine learning ranking module 79. A two-step process for ranking the articles using the machine learning ranking module is provided in FIG. 7.

Alternatively, one or more client systems 20 may analyze documents to determine document classification and annotation when operating as a stand-alone unit. In a stand-alone mode of operation, the client system stores or has access to the content repository 42 and custom classification terms lists 48 as well as the document filtration system 15. The graphical user (e.g., GUI, etc.) or other user interface (e.g., command line prompts, menu screens, etc.) may solicit information from a corresponding user pertaining to the document filtration, and may provide reports including search results and document ranking (e.g., percentage of documents classified into a respective category, percentage of documents not classified into a respective category, number of terms of a custom classification terms list found in a document, frequency of search terms in documents scored according to a priority score, ranking of annotated documents, etc.).

Document filtration system 15 may include one or more modules or units to perform the various functions of present invention embodiments described below. The various modules (e.g., document pre-processing module 71, document sectioning module 72, classifier term matching module 73, weighting/classification module 74, drug and gene subset module 75, rules-based module 77, machine learning annotation and analysis module 78, machine learning ranking module 79, etc.) may be implemented by any combination of any quantity of software and/or hardware modules or units, and may reside within memory 17, 23 of the server and/or client systems for execution by processor 16, 22.

The document pre-processing module 71 may render the documents readable by a machine reader. In some aspects, optical character recognition may be used to recognize text in a document, to render the text readable and searchable. Additionally, text in tables, images, image captions, or lists may also be rendered machine readable. This processing ensures that images of documents, e.g., scanned PDFs, are included in the analysis.

The drug and gene subset module 75 filters content (documents) of the content repository 42 to generate drug subsets and gene subsets of documents. For filtering, if a drug name is found in a document, that document is added to the document subset of drugs. If a gene name is found in a document, that document is added to the document subset of genes. In some aspects, the documents may be preprocessed using the preprocessing module 71 prior to filtration by module 75. The document subsets may be provided to the document sectioning module for further processing and analysis. Similar operations may be performed for other entities including gene name synonyms, gene variant name synonyms, drug name synonyms, and cancer-type name synonyms.

The document sectioning module 72 may be used to identify sections of machine readable documents. In some aspects, a document section may identified by an appropriate header. For example, the header "abstract" may indicate the presence of an abstract. The header "introduction" or "background" may indicate the presence of a section describing the current state of the art and/or background to help the reader better understand the context and rationale of the current study. The header "material and methods" may indicate an experimental section that describes the materials and methods and experimental protocols used during the course of experiments. The header "results" may indicate the presence of a results section showing data generated from the experiments. The header "discussion" may indicate the presence of a discussion section which interprets the experimental results. The header "conclusion" may indicate a summary of the experimental results of the document and future areas of investigation.

In some aspects, a section labeled with a header may be further divided into subsections having sub-headings. For example, the abstract may additionally contain sub-headers such as "objective", "methods", "results", and "conclusion". In some aspects, subsections of specific subheadings may be targeted to analyze content for specific custom classification terms.

The classifier term matching module 73 may search specific sections of each document for terms in a custom classification terms list or in a dictionary 43, as part of classification as a clinical or functional document. For example, a clinical classification term list may contain single terms or phrases that may be used to identify the document as a clinical document. As another example, a functional classification term list may contain single terms or phrases that may be used to identify the document as a functional document. Similar term lists may be provided for review articles, conference proceedings and abstracts, and case studies. In another example, dictionaries may be used by the classifier term matching module 73 to identify genes and variants in documents of the content repository. In some aspects, both functional and clinical information may be needed to determine the significance of a given biologic relationship. Functional information provides evidence regarding a gene's and/or gene variant's function, while clinical information provides evidence regarding a patient's response to treatment with a targeted therapy (clinical studies). For instance, the materials and methods section may be searched with custom-designed "functional query terms" to identify and classify functional articles. The abstract may be searched with custom-designed "clinical query terms" to identify and classify clinical articles. The results section may be searched for dictionary terms. In other aspects, a portion or all sections of a document may be searched, wherein the results of each section are differentially weighted and combined.

The weighting/classification module 74 may classify different documents within the content repository and documents within document subsets into different categories, such as clinical, functional, case study, review article, or conference proceedings and abstract. In some aspects, weighting scores may be used to classify documents as functional or clinical documents. Based on the number of terms or phrases identified in the specific section(s) of the document, a weighting score may be determined (see, e.g., FIG. 3). If the weighting score is above a classification threshold value, then the document may be classified into a respective category. Documents may be ranked for presentation to the user based upon the number of times a unique classification term appears in the methods section (for functional articles) or in the abstract section (for clinical articles). The weighting classification module 74 may also classify documents into respective categories (e.g., case study, review article, or conference proceedings and abstract) based on article type tags and/or weighting scores.

Rules-based annotation module 77 performs annotation on documents in the corpus based on a set of pre-defined rules (e.g., pattern matching, syntactical matching, grammatical matching, etc.). The annotated documents may form a training data set for the machine learning annotation and analysis module 78. Documents containing entities such as gene names, gene variant names, drugs, cancer-types, etc. may be identified and the documents annotated, e.g., by storing information in a metadata file or any other suitable format associated with the particular file.

Machine learning annotation and analysis module 78, which may be trained based on annotated data from the rules-based module 77, may analyze and annotate unlabeled documents from the corpus. The machine learning annotation and analysis module may learn or predict relationships (e.g., between gene/gene variants, gene/drug, etc.) during document annotation (see also, FIGS. 4-7). Such relationships include proximal relationships within a document, distant relationships within a document, relationships between documents, longitudinal relationships in a document.

In general, proximal relationships include relationships between entities within a specified distance of one another (e.g., within a specified number of words, within the same sentence, within the same paragraph, etc.) and are typically within a same document. In general, distant relationships include relationships between entities at or above a specified distance relative to each another (e.g., separated by a specified number of words, separated by a number of sentences, separated by a number of paragraphs, etc.) and are typically within a same document. Relationships between documents may include relationships between entities in two or more documents. Longitudinal relationships may include relationships between entities between two or more documents, wherein a new relationship is formed from an existing entity and a new entity that is discovered at a later point in time. In general, an entity includes terms that are identified and annotated by the document filtration system.

In some aspects, once classified, the documents may be stored in designated locations within database 40 (e.g., within classified documents 44), such that functional documents are located in a first directory, clinical documents are located in a second directory, and so forth. Alternatively, documents may be maintained in the same location within the content repository, but associated with metadata 49 that indicates whether the document is classified, the respective category that the document has been classified into, as well as information regarding entities identified within the document.

Documents that the system is not able to classify may be stored in unclassified documents 46. In some aspects, these documents may be moved into a corresponding directory for unclassified documents. Alternatively, documents may be maintained in the same location within the content repository, but associated with metadata 49 that indicates that the documents are unclassified. These documents may be subject to manual review.

FIGS. 2A-2E show various flow charts for classifying documents or document subsets into respective categories. Different types of documents (e.g., scientific publications and clinical articles, review articles, case reports, or meeting/proceeding abstracts, etc.) have certain physical publishing layout requirements including providing various types of data in discrete sections of the document, typically in a predefined order. Sections of the document may also be defined by the publishing requirements, and may include the title, abstract, introduction, materials and methods, analysis/results, and discussion/conclusion sections. These documents may reside in a content repository, wherein the documents are not classified into a category.

According to present invention embodiments, the documents are rendered machine readable allowing the headings and corresponding text to be processed by the filtration system 15. Each section may contain specific types of information. Accordingly, limiting the search for custom classification terms to particular sections ensures that the documents are classified correctly.

A rules-based module may be used to search in specific sections of a document to classify the type of document (e.g., an unstructured biomedical research article). The sectioned documents can be searched, for example, for user defined custom classification terms within the text of specific sections. Based on the search results, the filtration system can classify the documents in the content repository into a respective category. The rules-based filtering system may be configured to search in specific sections of a document to ensure the data originated in the current study, rather than being provided as a reference to another document.

Figure 2A:
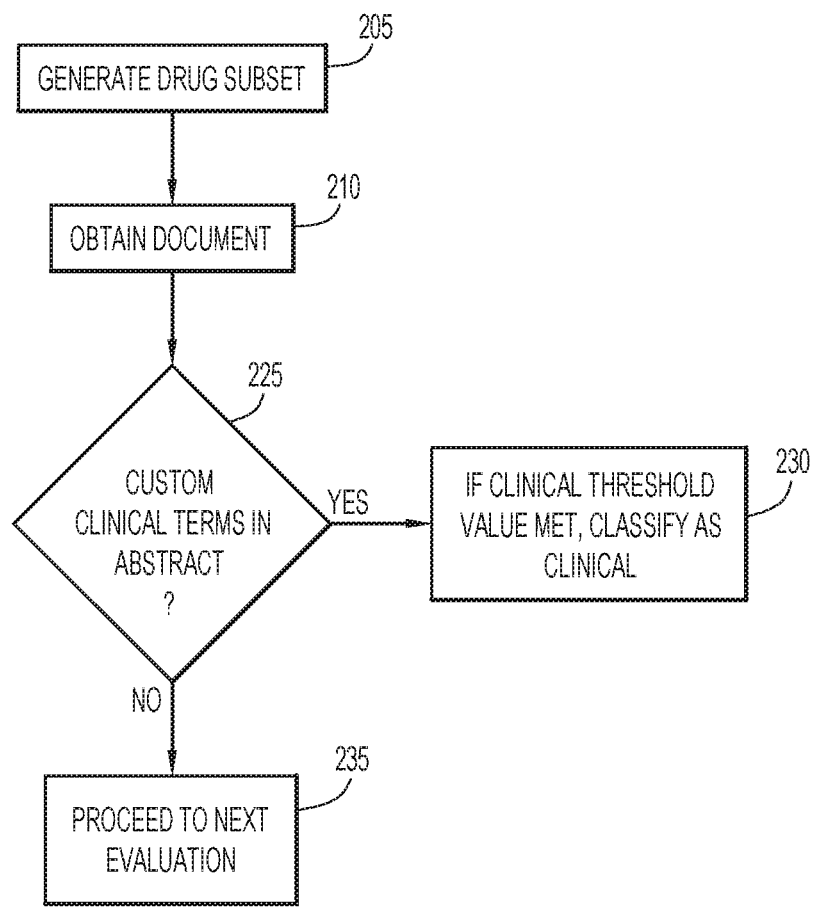
FIGS. 2A-2E are flow diagrams showing classification of a document into a respective category of documents, according to embodiments of the present disclosure.

FIG. 2A shows a flowchart for classifying clinical documents or document subsets. Clinical documents may provide evidence that a specific biologic relationship has important therapeutic ramifications. For example, a clinical document may contain a phrase such as "overexpression of erbb2 causes breast cancer" or "pertuzumab increases the rate of pathological complete response HER2-positive breast cancer".

To identify clinical documents, a drug subset of documents is generated at operation 205. A list of drug names may be provided to the drug and gene subset module 75, from the custom classification terms lists 48. Documents of the content repository are filtered using the list of drug names, and if a term (drug name) is found, the document is added to the drug subset of documents. At operation 210, a document is obtained from the content repository. At operation 225, a particular section of the document (e.g., the abstract section) may be searched for custom clinical classification terms and/or phrases. For example, a clinical filter comprising custom classification terms or phrases may be applied to the abstract portions of the documents of the content repository to identify clinical documents. If a threshold condition is met (e.g., the weighting score is greater than a clinical threshold value), at operation 230, the document is classified as clinical. Otherwise, the document may be evaluated for classification into a different category (e.g., functional, case study, review article, conference type and proceedings abstract, etc.) at operation 235.

In some aspects, the document may be moved into a directory associated with clinical documents. Alternatively, the document may remain in the content repository and may be associated with metadata indicating that the document is a clinical document.

Figure 2B:
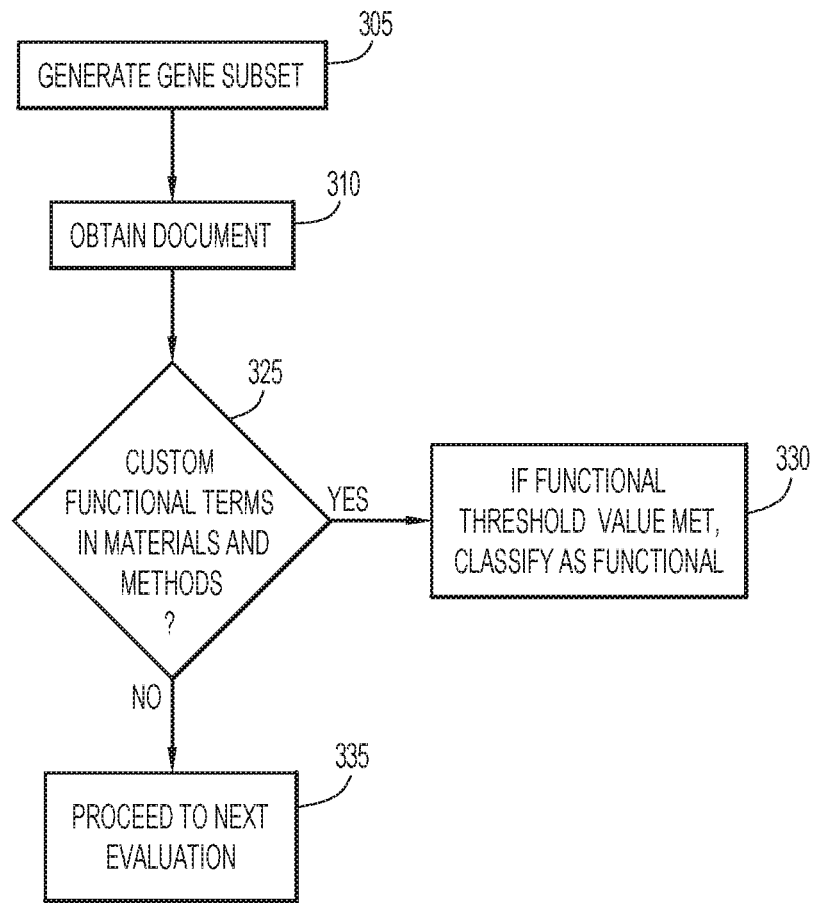

FIG. 2B shows a flowchart for classifying functional documents. Functional documents may provide evidence that a specific genomic alteration is oncogenic or promotes oncogenic properties. For example, a functional document may contain a phrase such as "HER2 transmembrane domain mutations (V659/G660) that stabilize homo- and heterodimerization are rare oncogenic drivers". To identify functional documents, the materials and methods section may be searched using a functional filter for custom functional classification terms.

To identify functional documents, a gene subset of documents is generated at operation 305. A list of gene names may be provided to the drug and gene subset module 75, from the custom classification terms lists 48. Documents of the content repository are filtered using the list of gene names, and if a term (gene name) is found, the document is added to the gene subset of documents. At operation 310, a document is obtained from the content repository. At operation 325, a particular section of the document (e.g., the methods and materials section) may be searched for custom functional classification terms and/or phrases. For example, a functional filter comprising custom classification terms or phrases may be applied to the materials and methods portions of the documents of the content repository to identify functional documents. If a threshold condition is met (e.g., the weighting score is greater than a functional threshold value), at operation 330, the document is classified as functional. Otherwise, the document may be evaluated for classification into a different category (e.g., clinical, case study, review article, conference type and proceedings abstract, etc.) at operation 335. In some aspects, the document may be moved into a directory associated with functional documents. Alternatively, the document may remain in the content repository and may be associated with metadata indicating that the document is a functional document.

Figure 2C:
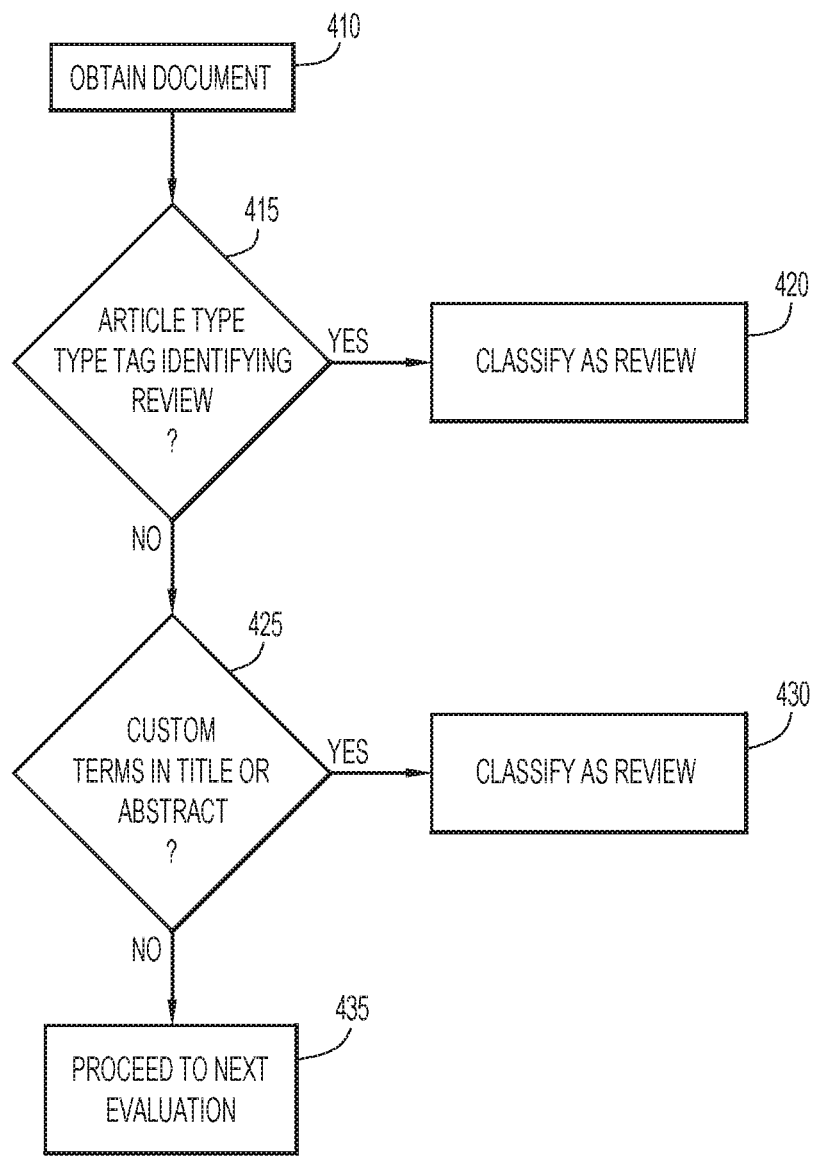

FIG. 2C shows a flowchart for classifying review articles. Review articles may summarize other research documents. For example, a review article may contain references to a plurality of other research documents with a related theme, such as "Kidney Cancer: Recent Advances and Future Directions". To identify review articles, the cover page, title, or header may be searched using a review filter for custom review classification terms.

To identify review articles, a document is obtained from the content repository at operation 410. At operation 415, the system determines whether an article type tag is associated with the document that indicates that the document is a review article. In some cases, review articles, conference proceedings and abstracts, and case studies may have an article type tag identifying the type of article. In other cases, clinical and functional studies may not have an article type tag as these categories of documents may contain both types of information in different sections. If such a tag is found, at operation 420, the system classifies the document as a review article. If an article type tag is not found, a particular section of the document (e.g., the title, cover page, headings) may be searched for custom review classification terms and/or phrases at operation 425. For example, a review filter comprising custom classification terms or phrases may be applied to the cover page, title, or headers of the documents of the content repository to identify review articles. For example, review articles generally include the phrase "review article" or equivalent on their front/cover page to indicate that the document is a review article. If a review article term is present, at operation 430, the document is classified as a review article. Otherwise, the document may be evaluated for classification into a different category (e.g., functional, case study, clinical, conference type and proceedings abstract, etc.) at operation 435.

In some aspects, the document may be moved into a directory associated with review articles. Alternatively, the document may remain in the content repository and be associated with metadata indicating that the document is a review article.

Figure 2D:
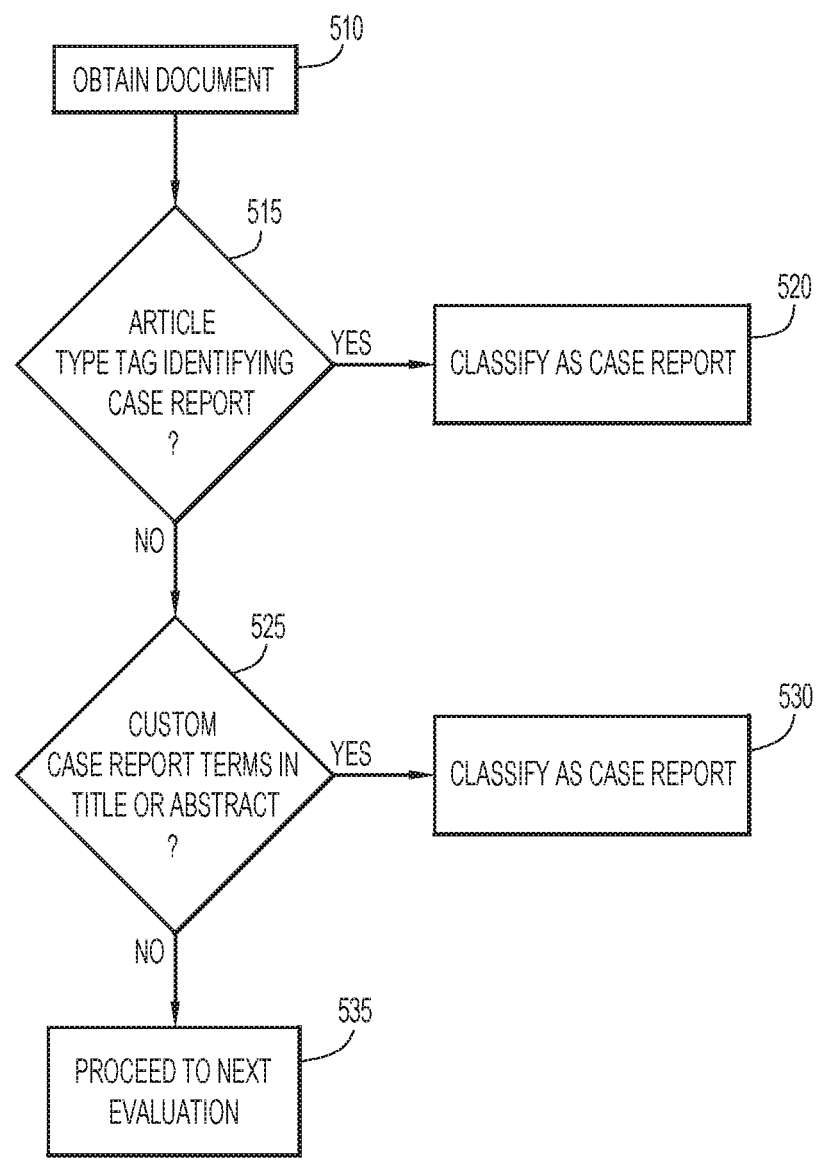

FIG. 2D shows a flowchart for classifying case reports. Case reports may provide information about a single patient, or in some cases, a small number of patients. These documents may not contain a large enough sample size representative of a population, and therefore, may skew data if not properly identified. For example, a case report (or case summary) may discuss a single patient outcome, such as "Kartagener syndrome—case report". To identify case reports, the cover page, title, or header may be searched using a case report filter for custom case report classification terms.

To identify a case report, a document is obtained from the content repository at operation 510. At operation 515, the system determines whether an article type tag is associated with the document that indicates that the document is a case report. An article type tag is typically a numeric identifier associated with documents in a database such as PubMed® or Medline® that identifies the document as a case report. If such a tag is found, at operation 520, the system classifies the document as a case report. If an article type tag is not found, a particular section of the document (e.g., the title, cover page, headings) may be searched for custom review classification terms and/or phrases at operation 525. For example, a case report filter comprising custom classification terms or phrases may be applied to the cover page, title, or headers of the documents of the content repository to identify a case report. For example, a case report generally includes the phrase "case report" on their front/cover page to indicate that the document is a case report. If a case report term is present, at operation 530, the document is classified as a case report. Otherwise, the document may be evaluated for classification into a different category (e.g., functional, review article, clinical, conference type and proceedings abstract, etc.) at operation 535.

In some aspects, the document may be moved into a directory associated with case reports. Alternatively, the case report may remain in the content repository and be associated with metadata indicating that the document is a case report.

Figure 2E:
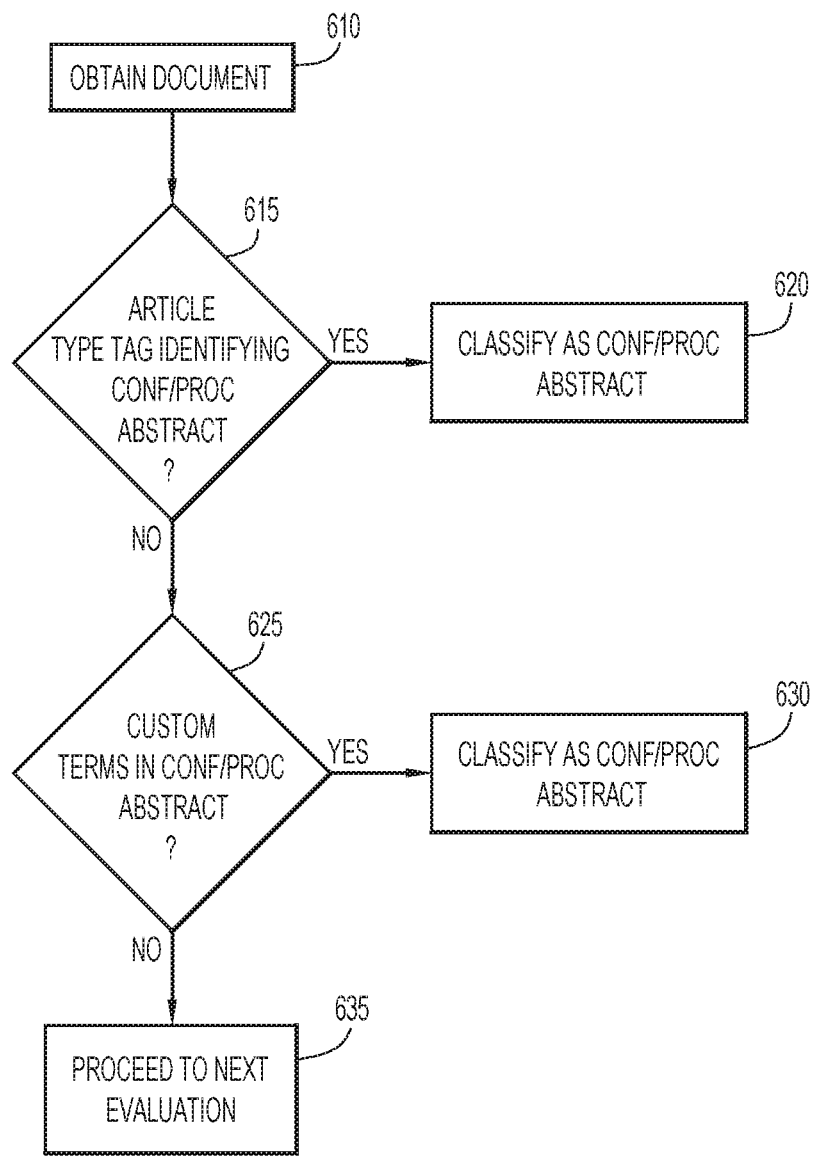

FIG. 2E shows a flowchart for classifying conference proceedings and abstracts. Conference proceedings and abstracts are short documents providing an overview of a presentation or poster from a conference. For example, conference proceedings and abstracts may contain a short summary of a research topic, such as "$12^{th}$ Annual Biotechnology Meeting: abstract collection". To identify conference proceedings and abstract documents, the cover page, title, or header may be searched using a conference proceedings and abstract filter for custom conference proceedings and abstract classification terms.

To identify conference proceedings and abstract documents, a document is obtained from the content repository at operation 610. At operation 615, the system determines whether an article type tag is associated with the document that indicates that the document is a conference proceedings and abstract article. If such a tag is found, at operation 620, the system classifies the document as a conference proceedings and abstract document. If an article type tag is not found, a particular section of the document (e.g., the title, cover page, headings) may be searched for custom conference proceedings and abstract classification terms and/or phrases at operation 625. For example, a conference proceedings and abstract filter comprising custom classification terms or phrases may be applied to the cover page, title, or headers of the documents of the content repository to identify conference proceedings and abstract documents. For example, conference proceedings and abstract documents generally include the phrase "conference proceeding" or abbreviation corresponding to the same on their front/cover page to indicate that the document is a conference proceedings and abstract. If a conference proceedings and abstract term is present, at operation 630, the document is classified as a conference proceedings and abstract. Otherwise, the document may be evaluated for classification into a different category (e.g., functional, review article, clinical, case report, etc.) at operation 635.

In some aspects, the document may be moved into a directory associated with conference proceedings and abstract documents. Alternatively, the document may remain in the content repository and be associated with metadata indicating that the document is a conference proceedings and abstract article.

In some aspects, a document may be classified both as a clinical document and as a functional document. In general, review articles, case reports and meeting/proceeding abstracts will not overlap in regards to classification. Classification may be performed in any evaluation order, such that the document may be evaluated with regard to the order shown in FIG. 2A-2E, or any other suitable order, and have any quantity of classifications.

Once all evaluations have been performed, then the process may terminate. Documents that are not identified, remain unclassified.

Figure 3:
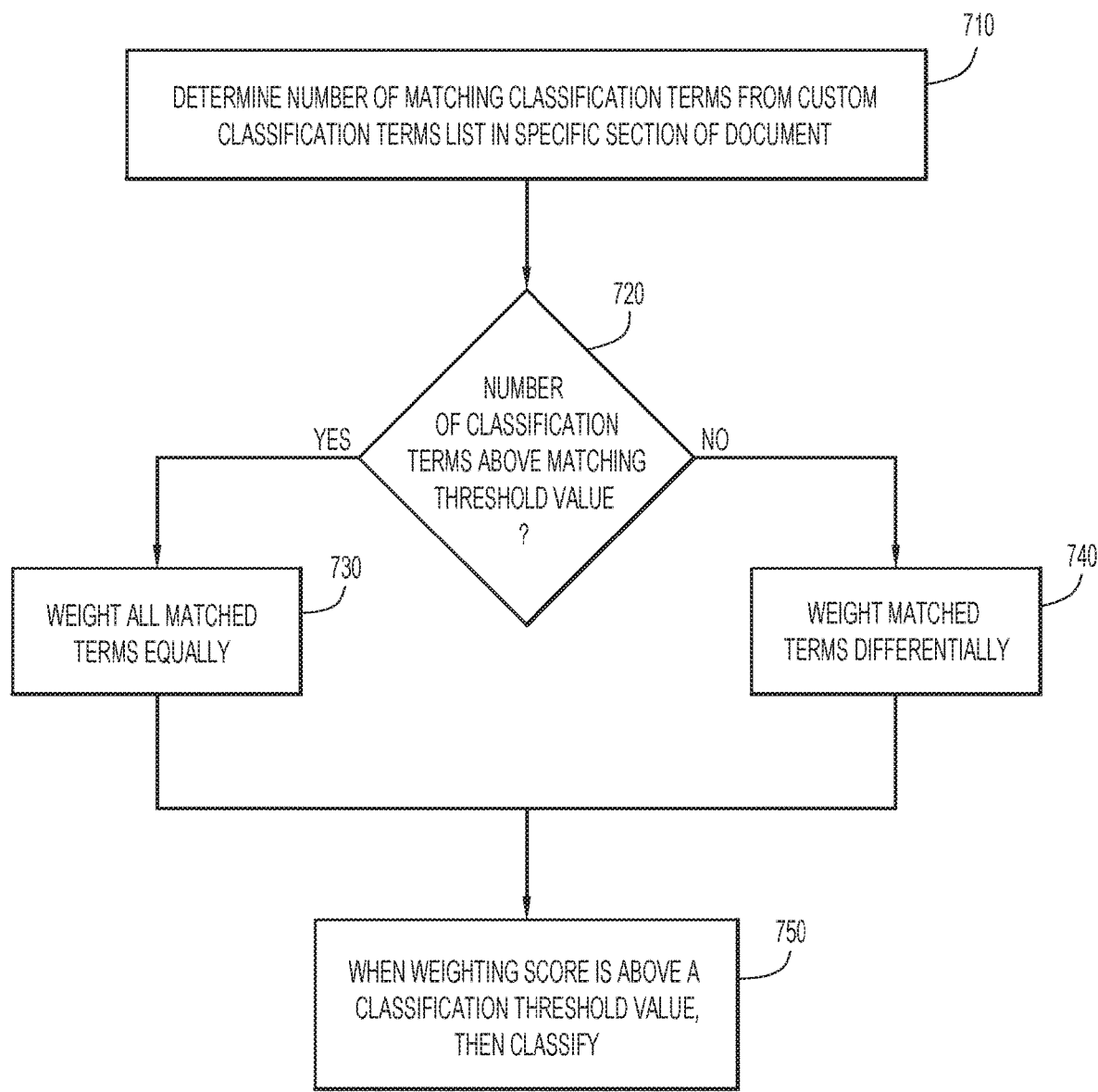
FIG. 3 is a flow diagram showing weighting of matching classification terms from a custom classification terms list for classification of the document, according to embodiments of the present disclosure.

FIG. 3 shows example operations of weighting matched classification terms (e.g., terms from a custom classification terms list that are found in a section of a document) for classification of the document. Custom classification terms may be weighted equally or differentially, as shown in FIG. 3, and results may be aggregated to determine classification of the document.

At operation 710, the number of matching classification terms of a custom classification terms list for a specific section of the document is determined. If the number of unique terms is above a matching threshold value (e.g., seven or more unique terms), all terms are weighted equally, at operation 730. If the weighting score (e.g., a sum of each unique term times a weighting factor of 1) is above a classification threshold value, then the document is classified accordingly at operation 750. If the custom classification terms list is a functional terms list, then the document is classified as a functional document. If the custom classification terms list is a clinical term list, then the document is classified as a clinical document.

If the number of matching classification terms is below a matching threshold value, the matched terms are weighted differentially (e.g., four unique terms may be weighted with a factor of 0.3, five unique terms may be weighted with a factor of 0.6, and six unique terms may be weighted with a factor of 0.8), at operation 740. If the weighting score (e.g., sum of each unique term times a respective weighting factor) is above a classification threshold value, then the document is classified accordingly at operation 750. For example, if too few unique terms are identified, and the weighting score is below a classification threshold value, then the document will not be classified in the respective category.

Figure 4:
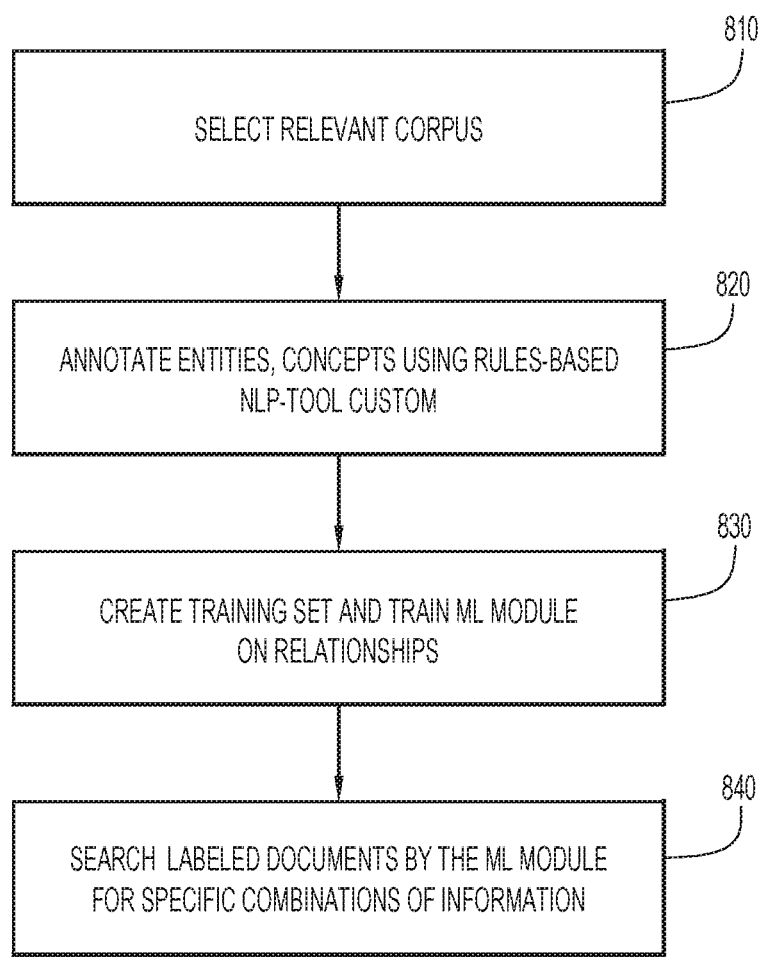
FIG. 4 is a high level flow chart of a machine learning process for annotating documents, according to embodiments of the present disclosure.
Figure 5:
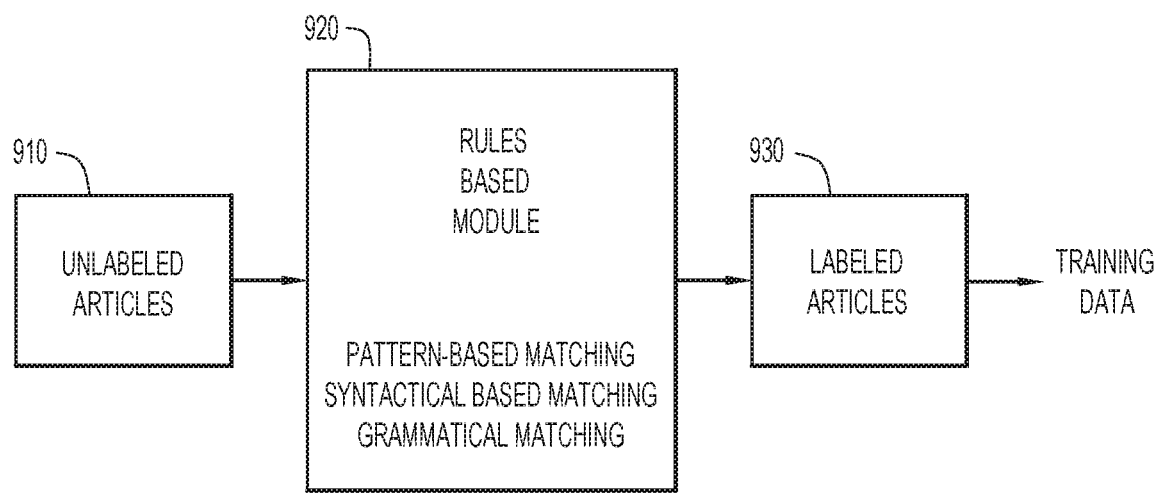
FIG. 5 is an example flowchart showing operations of a rule-based annotation module, according to embodiments of the present disclosure.
Figure 6:
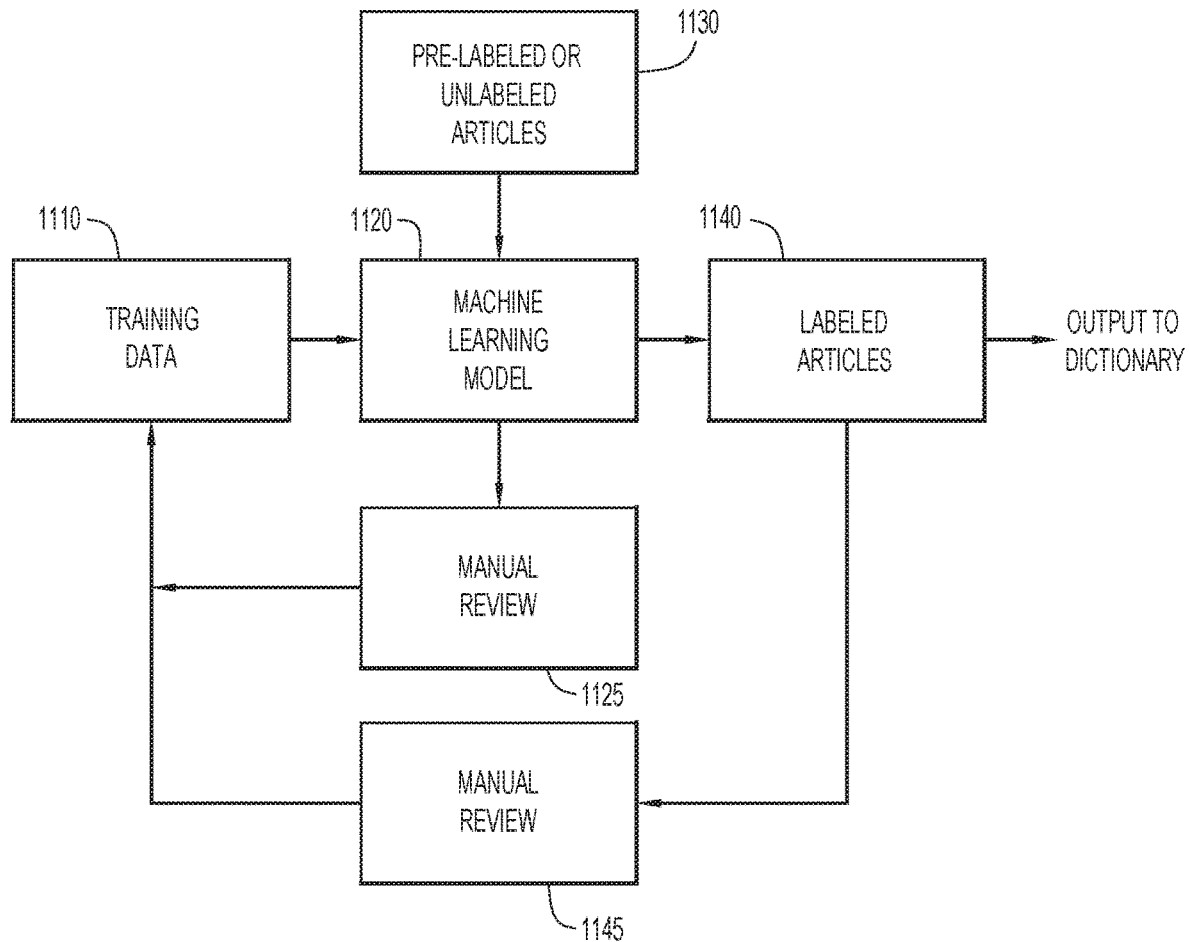
FIG. 6 is an example flowchart showing aspects of using a machine learning system to label articles, according to embodiments of the present disclosure.
Figure 7:
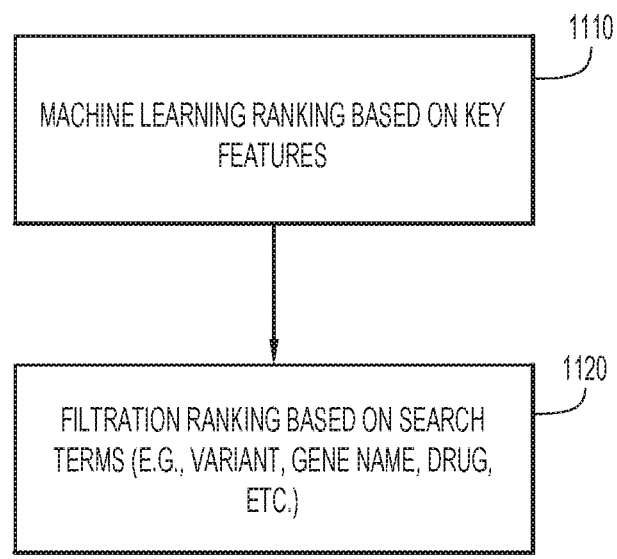
FIG. 7 is an example flowchart showing ranking operations of the document filtration and machine learning system, according to embodiments of the present disclosure.

FIG. 4 shows an overview of the machine learning annotation and analysis module 78. FIGS. 5-7 show additional aspects of this process. At operation 810, a relevant corpus of documents is selected. The documents may belong to a specific category (e.g., cancer-related, and may be curated by a subject matter expert to ensure relevance and quality). At operation 820, entities may be annotated using a rules-based module. The annotations may be stored as metadata or any other suitable format. At operation 830, a training data set is created from the documents annotated by the rules-based system and used to train the machine learning annotation and analysis module. At operation 840, labeled documents by the machine learning annotation and analysis module, which may be ranked according to relevance based on entities analyzed by the machine learning ranking module 79 or a priority score, may be searched and ranked based on user defined terms (e.g., biomarker, gene, cancer-type, drug, etc.) as well as document type. These techniques allow specific types of information to be identified and provided to a user, wherein the information may include novel relationships between entities (e.g., longitudinal relationships, proximal relationships, distant relationships, relationships between documents, relationships in a single document, etc.), as determined by the filtration system 15.

FIG. 5 shows an example flow chart of a rules-based module. Unlabeled articles or documents 910 may be provided to the rules-based module 920, which may perform pattern matching, syntactical matching, grammatical or other rules-based techniques to identify genes, gene variants, drugs and cancer-types, etc. Rules-based annotation typically involves identifying relationships between entities that are proximal to each other (e.g., within a phrase, within a sentence, within a set number of words, etc.) within a document. In some aspects, the rules-based module may perform entity extraction and association, in which gene variants and genes are extracted and variants are associated with a particular gene. Association may be determined based on proximity of the gene to a variant as well as context of the phrase in which the variant is found. The articles may be annotated or labeled to generate labeled articles 930 based on the results of the rules-based module. The labeled articles may be provided to the machine learning annotation and analysis module as training data. In some cases, the rules-based annotated data may be manually curated by a subject matter expert to ensure that correct and accurate information is provided in the training data set 1020.

In addition to genes, gene variants, drugs, and cancer types, the rules-based module may annotate biomarkers, sensitivity to cancer drugs, predisposition to cancers, prognostic aspects of cancer, diagnostic aspects of cancer, as well as drug resistance in different types of cancer. For example, relationships between entities may include but are not limited to genes, gene variants, biomarkers, etc. that are resistant or sensitive to specific drugs or drug combinations, as well as in some cases correlation with specified cancer-types.

FIG. 6 shows an example flow diagram for using a machine learning annotation and analysis module to annotate pre-labeled or unlabeled articles (not provided as part of the training data set).

The machine learning annotation and analysis module may extract and annotate variants across a corpus of documents. For example, the machine learning annotation and analysis module may be trained to find different types of representations of variants in specific sections of the articles (e.g., the results section), or within the entire article, and may autonomously convert the representations to appropriate standardized annotations (e.g., an identifier unique to the variant). In some aspects, the machine learning annotation and analysis module may be trained to identify mutations in genes associated with cancer (e.g., 1200+ genes). In some aspects, the gene variants may be stored as a dictionary and added to the rules-based module of the filtering system 15.

For example, training data 1110 (e.g., from the rules-based module) is used to train the machine learning annotation and analysis module 1120. The training data may be annotated by an expert in the field, and may include different forms of representing genetic variants (e.g., 'omics data such as DNA sequences, RNA sequences, protein sequences, etc.).

Once trained, the machine learning annotation and analysis module 1120 may evaluate pre-labeled or unlabeled articles to produce a set of labeled articles 1140. For example, in some embodiments, the machine learning annotation and analysis module may extract entities and annotate the extracted entities to form relationships from the entities within an unlabeled document or among multiple documents. The performance of the machine learning annotation and analysis module may be evaluated for accuracy and precision based on analysis of the corresponding labeled articles 1140. These articles may also be manually reviewed and added to the training data 1110 to improve the performance of the machine learning annotation and analysis module 1120. For example, the labeled articles may undergo manual review at operation 1125 by a subject matter expert. Based on the results, the training data may be used to retrain the machine learning annotation and analysis module 1120 to improve its accuracy and precision.

Once the machine learning annotation and analysis module has been sufficiently trained to meet a specified precision and/or accuracy, the machine learning annotation and analysis module 1120 may be provided with unlabeled articles or pre-labeled articles 1130 for annotation. For example, documents may be annotated (pre-labeled) using NLP and rules-based tools with entities from custom-built dictionaries that include: 1) gene names, 2) gene variant names (normalized and standardized), 3) targeted drugs, and/or 4) cancer-types. In an embodiment, present techniques allow for training data generated from a rules-based annotation system to be provided to a machine learning annotation and analysis system as training data.

At operation 1130, machine learning may also be used to identify relationships between pre-annotated/pre-labeled entities that are annotated in advance using NLP tools with custom-built dictionaries (e.g., a gene dictionary, a variant dictionary, a drug dictionary, a cancer-type dictionary, etc.). Machine learning may be used to identify relationships between genes or gene variants, biomarkers, cancer-types, and drug responses as well as disease diagnoses, disease prognoses, disease drug resistances, and predispositions to cancer.

As an example, PIK3CA (gene name) H1047R (variant name) predicts a response (i.e., is a predictive biomarker) to everolimus (drug name) in breast cancer (cancer-type)). As another example, the machine learning annotation and analysis module identifies relationships likely to impact clinical decision making, such as relationships between terms and entities in the pre-annotated documents, using a machine learning model (e.g., biomarker type (predicts drug resistance)/gene variant (EGFR T790M)/cancer-type (NSCLC)/drug-type (gefitinib)).

In some cases, the unlabeled articles may be analyzed by the machine learning annotation and analysis module 1120, the gene variants may be extracted and associated with a gene, and added to a corresponding dictionary (e.g., a dictionary which lists known forms of a variant of a particular gene). The labeled articles 1140 may undergo manual review 1145, and if additional training is needed to improve the accuracy and/or precision of the machine learning annotation and analysis module, the training data 1110 may be updated with this new data, and the machine learning annotation and analysis module updated. In some aspects, normalized training data may be provided from the rules-based module. Thus, according to present techniques, the machine learning annotation and analysis module may annotate clean or pre-labeled documents to identify gene-variant relationships.

In addition to performing automatic annotation of documents, the machine learning annotation and analysis module may identify various types of complex 'omic relationships in a data corpus. These relationships may include novel relationships between entities (e.g., novel relationships between genes, gene variants, drugs, cancer types, etc.), and may also include both proximal relationships and distant relationships (e.g., in single and/or multiple articles).

For example, if a first genetic variant is linked to a specific type of cancer, and there are other variants similar to the first type of variant in the article, the system may predict that these other variants may also be involved in pathogenesis of the cancer type. In some cases, these types of relationships may be uncovered when the relationships are proximal, while in other cases the relationships may be uncovered when the entities are distant or within separate documents.

In another example, the machine learning annotation and analysis module may identify new relationships among entities in different documents. Here, the machine learning annotation and analysis module may extract entities and perform annotations to form new relationships in entities distributed across different documents. For example, an entity A may be connected to an entity B in a first document, and the entity B may be associated with entity C in a different document Therefore, the system may determine an association between entity A and C.

The association between entity A and entity C may involve multiple intermediate entities (e.g., two, three, four, etc.), and is not intended be limited to a single entity. In this way, new relationships or associations may be formed from a corpus of existing documents. The machine learning annotation and analysis module may process the corpus to identify relationships that were not previously identified in the art.

As another example, for a gene variant that is implicated in a specific type of cancer, a future study may implicate this same variant in a second type of cancer. Thus, the machine learning system may identify longitudinal relationships, as new information becomes available in published documents and other sources of information, e.g., to identify therapeutics to treat the second type of cancer, based on the first type of cancer.

In still another example, the system may identify a variant that is sensitive to a particular first drug but that loses its sensitivity to this drug as a function of time, e.g., during treatment. The system may also identify another variant that is not sensitive to the first drug, but that is sensitive to a new second drug. Accordingly, the system may recommend treatment of the patient with the second drug. In this case, the first variant may be similar to the second variant, in which case the second drug would be predicted to be efficacious, or the second variant may be present with the genomic profile of the patient.

Any suitable machine learning module may be used. For example, the machine learning module may utilize neural nets, deep learning neural nets, convolutional neural nets, statistical classifiers, etc. to perform the operations described herein.

In some aspects, a search request including one or more search terms may be processed by comparing the search terms to the documents and annotations. For example, the search terms may be used to filter the normalized annotated documents by functional or clinical type, identify particular variants of genes, identify particular variants in particular cancers, identify particular drugs for specific variants, etc. In some aspects, the documents may be partitioned into sections, such that only specified sections of the document are compared to the search terms. In other aspects, all portions of the documents are analyzed. The relevancy of a document may be determined based on the annotations and frequency of occurrence of the search terms in each of the specific sections (or the entire document). The sections and/or annotations may be weighted to indicate an importance of each relative to the search.

Once documents are identified as satisfying the search request, the documents may be ranked in priority order based on the determined relevance or using the machine learning ranking module 79. This approach provides enhanced document retrieval and search accuracy (for gene mutations) relative to simple key word searching.

In another embodiment, multiple forms for the gene variant are provided to a machine learning annotation and analysis module as training data, wherein the trained machine learning annotation and analysis module annotates the unlabeled (or labeled) documents in the corpus to indicate a presence of the gene variant in respective documents. This process accelerates labeling of the unlabeled document corpus, allowing this process to become automated. Additionally, the accuracy and precision of the machine learning annotation and analysis module may improve as a function of time, and the module may re-annotate previously annotated documents as new forms are identified.

FIG. 7 shows an example of a two stage ranking/scoring process that may be incorporated into the present techniques. At operation 1110, machine learning ranking may be performed based on key features. The user may define key features or relationships, e.g., biomarkers that are highly predictive may be ranked higher than those that are less predictive, drugs that are highly efficacious, etc. The annotated machine learning documents may be ranked based on frequency and location (e.g., results, conclusion, introduction, abstract, materials and methods, etc.) of the key features in the document. In some cases, document sections may be differentially weighted, and the results (e.g., frequency per document section or location) may be combined. In this example, the machine learning ranking module may be built to rank articles based on the type of biomarker and level of evidence provided (i.e., strength of the evidence). The machine learning ranking module may be used in lieu of the priority scoring system.

The second step may include filtration ranking based on search terms 1120 (e.g., variant, gene name, drug, etc.) or article type (e.g., clinical or functional, etc.). In some aspects, a search request including one or more search terms may be processed by comparing the search terms (e.g., wherein the search terms filter by functional or clinical type, identify particular variants of genes, identify particular variants in particular cancers, identify particular drugs for specific variants, etc.) to the documents and annotations. In some aspects, the documents may be partitioned into sections, such that only specified portions of the document are analyzed. For example, the documents may be partitioned into specific sections, wherein each section is compared to the search terms. In other aspects, all portions of the documents are analyzed. The relevancy of a document may be determined based on the annotations and frequency of occurrence of the search terms in each of the specific sections (or the entire document.). The sections and/or annotations may be weighted to indicate an importance of each document relative to the search.

In other embodiments, a machine learning ranking module 79 may rank articles based on any suitable feature (e.g., entities, relationships, counts, section of articles and corresponding weights, etc.).

Thus, the documents may be ranked, based on the determined relevance as determined by key features of the machine learning ranking module 79 and relevance of search terms or according to a priority score (not shown in FIG. 7). In some cases, the machine learning ranking may be weighted equally as compared to the filtration ranking, when combining the two types of ranking. In other cases, the machine learning ranking may be weighted more or less than the filtration ranking, when combining the two types of ranking. This approach provides enhanced document retrieval and search accuracy (for gene mutations) relative to simple key word searching.

Figure 8:
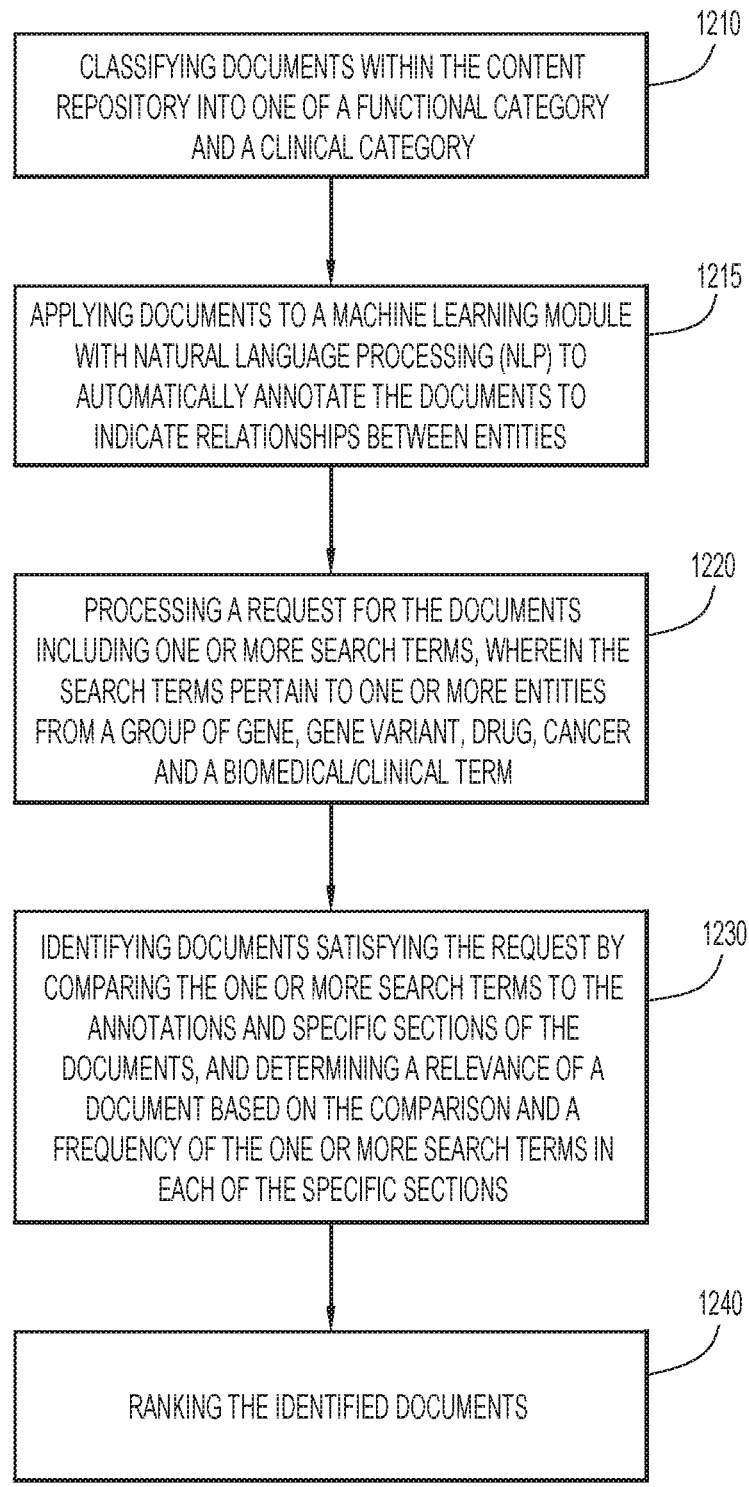
FIG. 8 is a high level flow diagram of the document filtration and machine learning system, according to embodiments of the present disclosure.

FIG. 8 shows a flow chart of example operations. At operation 1210, documents within the content repository may be classified into one of a functional category and a clinical category. At operation 1215, documents are applied to a machine learning annotation and analysis module with NLP to automatically annotate the documents to indicate relationships between entities. At operation 1220, a request is processed for the documents including one or more search terms, wherein the search terms pertain to one or more entities from a group of gene, gene variant, drug, cancer and a biomedical/clinical term. At operation 1230, documents satisfying the request are identified by comparing the one or more search terms to the annotations and specific sections of the documents, and determining a relevance of a document based on the comparison and a frequency of the one or more search terms in each of the specific sections. At operation 1240, the identified documents are ranked in accordance with a priority based on the determined relevance or using machine learning to rank documents based on search terms.

Present techniques provide a variety of advantages over existing approaches. For example, present techniques may utilize a data set of current and historical material, including full length articles, specifically related to cancer genomics to provide cancer-specific results. In come cases, sequence variation data mapped to nucleic acid databases may be relied upon. Additionally, distant relationships between entities in articles and longitudinal relationships between entities in different articles may be identified by present techniques. An annotated cancer specific genomic data training set may be used to train a machine learning system to identify complex, genomic relationships, including distant relationships in articles, from a corpus of cancer-specific information. Machine learning techniques may be used to identify novel types of cancer-specific relationships in the corpus. Additionally, the cancer specific genomic articles may be ranked based on a custom-designed modules.

Additionally, the system may be fully customized to allow the user to choose what type of information to target (e.g., functional documents, clinical documents, etc. in combination with one or more genes, gene variants, targeted drugs and cancer-types, etc. in a ranked and prioritized manner). Thus, the system is fully customizable as the user can choose what type of information to target (e.g., functional or clinical articles in combination with one or more of genes, gene variants, targeted drugs, and cancer-types, etc.).

Present techniques also offer enhanced searching and new capabilities as a user can access particular types of content. In particular, users can access articles comprising gene names, drug names and cancer types that are strictly functional articles or strictly clinical articles. Present techniques may be integrated with precision cancer medicine (also referred to as personalized medicine or genomic medicine). In precision medicine, an individual's genomic profile is determined to identify genetic biomarkers that predict drug response. Accordingly, the present system provides a way to search for and access information specific to a particular patient to generate a customized treatment plan.

It will be appreciated that the embodiments described above and illustrated in the drawings represent only a few of the many ways of implementing embodiments for filtering and scoring articles using a machine learning approach to access specific, customized information to determine new relationships between different types of data.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, document filtration and scoring system, etc.). These systems may include any types of monitors and input devices (e.g., keyboard, mouse, voice recognition, etc.) to enter and/or view information.

It is to be understood that the software (e.g., document filtration and scoring system 15 and document pre-processing module 71, document sectioning module 72, classifier term matching module 73, weighting/classification module 74, drug and gene subset module 75, rules-based module 77, machine learning annotation and analysis module 78, machine learning ranking module 79, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., document filtration and scoring system 15 and document pre-processing module 71, document sectioning module 72, classifier term matching module 73, weighting/classification module 74, drug and gene subset module 75, rules-based module 77, machine learning annotation and analysis module 78, machine learning ranking module 79, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., content repository 42, classified documents 44, unclassified documents 46, custom classification terms lists 48, metadata 49, dictionaries 43, etc.). The database system may be implemented by any number of any conventional or other databases, data stores or storage structures (e.g., files, databases, data structures, data or other repositories, etc.) to store information (e.g., content repository 42, classified documents 44, unclassified documents 46, custom classification terms lists 48, metadata 49, dictionaries 43, etc.). The database system may be included within or coupled to the server and/or client systems. The database systems and/or storage structures may be remote from or local to the computer or other processing systems, and may store any desired data (e.g., content repository 42, classified documents 44, unclassified documents 46, custom classification terms lists 48, metadata 49, dictionaries 43, etc.).

The present invention embodiments may employ any number of any type of user interface (e.g., Graphical User Interface (GUI), command-line, prompt, etc.) for obtaining or providing information (e.g., content repository 42, classified documents 44, unclassified documents 46, custom classification terms lists 48, metadata 49, dictionaries 43, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include a listing of prioritized documents along with any other information arranged in any fashion, and may be configurable based on rules or other criteria to provide desired information to a user (e.g., article analytics, weighting scores, search terms, etc.).

The present invention embodiments are not limited to the specific tasks or algorithms described above, but may be utilized for any application in which machine learning may be used to identify new relationships among entities of a content repository within the context of a custom filtration and scoring system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises a document of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of managing documents within a content repository comprising:
   classifying documents within the content repository into one of a functional category and a clinical category;
   applying documents to a trained machine learning annotation and analysis module to automatically annotate the documents to indicate relationships between entities;
   processing a request for the documents including one or more search terms, wherein the search terms pertain to one or more entities from a group of gene, drug, gene variant, disease, and a biomedical/clinical term;
   identifying documents satisfying the request by comparing the one or more search terms to the annotations and specific sections of the documents, and determining a relevance of a document based on the comparison and a frequency of the one or more search terms in each of the specific sections, wherein predetermined weight values are applied to each of the specific sections, the predetermined weight values selected according to a category of the specific section, to determine the relevance of the document based on the frequency of the one or more search terms in each of the specific sections; and
   ranking the identified documents.

2. The method of claim 1, wherein the machine learning annotation and analysis module identifies novel relationships among entities in a document, wherein the entities are not proximal to each other in the document.

3. The method of claim 1, wherein the machine learning annotation and analysis module identifies novel relationships among entities in different documents.

4. The method of claim 1, wherein the machine learning annotation and analysis module identifies novel longitudinal relationships among entities in different documents.

5. The method of claim 3, further comprising:
   providing multiple forms for the gene variant to a machine learning annotation and analysis module as training data; and
   annotating using the trained machine learning annotation and analysis module, unlabeled documents in the training data to indicate presence of the gene variant in respective documents.

6. The method of claim 1, wherein new documents are annotated using a machine learning annotation and analysis module, NLP with dictionaries, or NLP with dictionaries and a rules-based model.

7. The method of claim 1, wherein the ranking comprises:
   ranking the annotated documents using a trained machine learning ranking module that identifies articles based on similarity to user-supplied search criteria.

8. The method of claim 1, wherein the ranking comprises:
   ranking the identified documents in accordance with a priority based on the determined relevance.

9. The method of claim 1, comprising:
   identifying and annotating terms and entities in the document; and
   applying documents to the trained machine learning annotation and analysis module to automatically annotate the documents to indicate relationships between entities.

10. The method of claim 9, comprising:
    using NLP-based tools, a rules-based model, a machine learning annotation and analysis module, or any combination thereof to identify and annotate the terms and the entities.

11. The method of claim 1, wherein the identified documents comprise a specific combination of a gene or gene variant, a drug, and a cancer-type.

12. A computer system for managing documents within a content repository, wherein the system comprises at least one processor configured to:
    classify documents within the content repository into one of a functional category and a clinical category;
    apply documents to a trained machine learning annotation and analysis module to automatically annotate the documents to indicate relationships between entities;
    process a request for the documents including one or more search terms, wherein the search terms pertain to one or more entities from a group of gene, drug, gene variant, disease, and a biomedical/clinical term;
    identify documents satisfying the request by comparing the one or more search terms to the annotations and specific sections of the documents, and determine a relevance of a document based on the comparison and a frequency of the one or more search terms in each of the specific sections, wherein predetermined weight values are applied to each of the specific sections, the predetermined weight values selected according to a category of the specific section, to determine the relevance of the document based on the frequency of the one or more search terms in each of the specific sections; and
    rank the identified documents.

13. The system of claim 12, wherein the machine learning annotation and analysis module identifies novel relationships among entities in a document, wherein the entities are not proximal to each other in the document.

14. The system of claim 12, wherein the machine learning annotation and analysis module identifies novel relationships among entities in different documents.

15. The system of claim 14, wherein the at least one processor is further configured to:
provide multiple forms for the gene variant to a machine learning annotation and analysis module as training data; and
annotate using the trained machine learning annotation and analysis module, unlabeled documents in the training data to indicate presence of the gene variant in respective documents.

16. The system of claim 12, wherein new documents are annotated using a machine learning annotation and analysis module, NLP with dictionaries, or NLP with dictionaries and a rules-based model.

17. The system of claim 12, wherein the at least one processor is further configured to:
rank the annotated documents using a trained machine learning ranking module that identifies articles based on similarity to user-supplied search criteria.

18. The system of claim 12, wherein the at least one processor is further configured to:
identify and annotate terms and entities in the document; and
apply documents to the trained machine learning annotation and analysis module to automatically annotate the documents to indicate relationships between entities.

19. A computer program product for managing documents within a content repository, the computer program product comprising one or more computer readable storage media collectively having program instructions embodied therewith, the program instructions executable by a computer to cause the computer to:
classify documents within the content repository into one of a functional category and a clinical category;
apply documents to a trained machine learning annotation and analysis module to automatically annotate the documents to indicate relationships between entities;
process a request for the documents including one or more search terms, wherein the search terms pertain to one or more entities from a group of gene, drug, gene variant, disease, and a biomedical/clinical term;
identify documents satisfying the request by comparing the one or more search terms to the annotations and specific sections of the documents, and determine a relevance of a document based on the comparison and a frequency of the one or more search terms in each of the specific sections, wherein predetermined weight values are applied to each of the specific sections, the predetermined weight values selected according to a category of the specific section, to determine the relevance of the document based on the frequency of the one or more search terms in each of the specific sections; and
rank the identified documents.

20. The computer program product of claim 19, wherein the machine learning annotation and analysis module identifies novel relationships among entities in a document, wherein the entities are not proximal to each other in the document or wherein the machine learning annotation and analysis module identifies novel relationships among entities in different documents.

* * * * *